(12) United States Patent
Hino et al.

(10) Patent No.: US 8,828,249 B2
(45) Date of Patent: Sep. 9, 2014

(54) OPTICAL DEFLECTOR AND METHOD OF MANUFACTURING THE SAME

(71) Applicant: Seiko Epson Corporation, Tokyo (JP)

(72) Inventors: Makiko Hino, Chino (JP); Yasushi Mizoguchi, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/668,900

(22) Filed: Nov. 5, 2012

(65) Prior Publication Data
US 2013/0126469 A1 May 23, 2013

Related U.S. Application Data

(62) Division of application No. 12/403,832, filed on Mar. 13, 2009, now Pat. No. 8,331,003.

(30) Foreign Application Priority Data

| Mar. 13, 2008 | (JP) | 2008-063524 |
| Aug. 27, 2008 | (JP) | 2008-218586 |
| Mar. 6, 2009 | (JP) | 2009-053350 |

(51) Int. Cl.
*B29D 11/00* (2006.01)
*B44C 1/22* (2006.01)
*G02B 26/08* (2006.01)

(52) U.S. Cl.
CPC ............. *B44C 1/227* (2013.01); *G02B 26/085* (2013.01)
USPC .............. 216/24; 216/2; 216/41; 216/83

(58) Field of Classification Search
USPC .............................. 216/2, 24, 41, 83
See application file for complete search history.

(56) References Cited

U.S. PATENT DOCUMENTS

| 3,962,052 | A | * | 6/1976 | Abbas et al. ............. 216/2 |
| 5,066,358 | A | * | 11/1991 | Quate et al. ............. 216/2 |
| 5,629,244 | A | * | 5/1997 | Matsuzaki ............. 438/52 |
| 6,538,799 | B2 | | 3/2003 | McClelland et al. |
| 6,723,250 | B1 | * | 4/2004 | Schaefer et al. ............. 216/2 |
| 6,906,848 | B2 | | 6/2005 | Aubuchon |
| 6,924,914 | B2 | | 8/2005 | Kato et al. |
| 6,953,254 | B2 | | 10/2005 | Pesik |
| 7,002,719 | B2 | | 2/2006 | Tran |
| 7,009,748 | B2 | | 3/2006 | Turner et al. |

(Continued)

FOREIGN PATENT DOCUMENTS

| JP | 2002-321198 | 11/2002 |
| JP | 2003-090977 | 3/2003 |

(Continued)

OTHER PUBLICATIONS

Office Action issued Sep. 9, 2010 from Chinese Patent Office with full English translation.

*Primary Examiner* — Shamim Ahmed
(74) *Attorney, Agent, or Firm* — Harness, Dickey & Pierce, P.L.C.

(57) ABSTRACT

An optical deflector has: a movable plate having a reflecting surface and a side surface; and a support portion that supports the movable plate in such a manner that the movable plate is able to rotate around a predetermined axis, in which the side surface of the movable plate is recessed toward the axis.

4 Claims, 17 Drawing Sheets

(56) References Cited

U.S. PATENT DOCUMENTS

| | | |
|---|---|---|
| 7,057,783 B2 | 6/2006 | Kato et al. |
| 7,061,063 B2 | 6/2006 | Kato et al. |
| 7,105,097 B2 * | 9/2006 | Hess ............................. 216/27 |
| 7,221,493 B2 * | 5/2007 | Fujii et al. ................... 359/213.1 |
| 7,529,011 B2 | 5/2009 | Fujii |
| 7,586,669 B2 | 9/2009 | Pan |
| 7,742,219 B2 | 6/2010 | Kurozuka et al. |
| 7,751,113 B2 | 7/2010 | Huibers |
| 2002/0113675 A1 | 8/2002 | Kato et al. |
| 2002/0114053 A1 | 8/2002 | Yasuda et al. |
| 2003/0016428 A1 | 1/2003 | Kato et al. |
| 2003/0178913 A1 * | 9/2003 | Norimatsu ..................... 310/309 |
| 2004/0079723 A1 * | 4/2004 | Moon et al. ....................... 216/2 |
| 2005/0046918 A1 | 3/2005 | Yasuda et al. |
| 2005/0185240 A1 | 8/2005 | Kato et al. |
| 2005/0219674 A1 | 10/2005 | Asai et al. |
| 2006/0209378 A1 | 9/2006 | Yasuda et al. |
| 2007/0041068 A1 | 2/2007 | Heminger et al. |
| 2009/0002797 A1 | 1/2009 | Kwong et al. |

FOREIGN PATENT DOCUMENTS

| | | |
|---|---|---|
| JP | 2003-131161 | 5/2003 |
| JP | 2004-034256 | 2/2004 |
| JP | 2004-037886 | 2/2004 |
| JP | 2004-191953 A | 7/2004 |
| JP | 2005-300927 | 10/2005 |
| JP | 2007-152497 | 6/2007 |

* cited by examiner

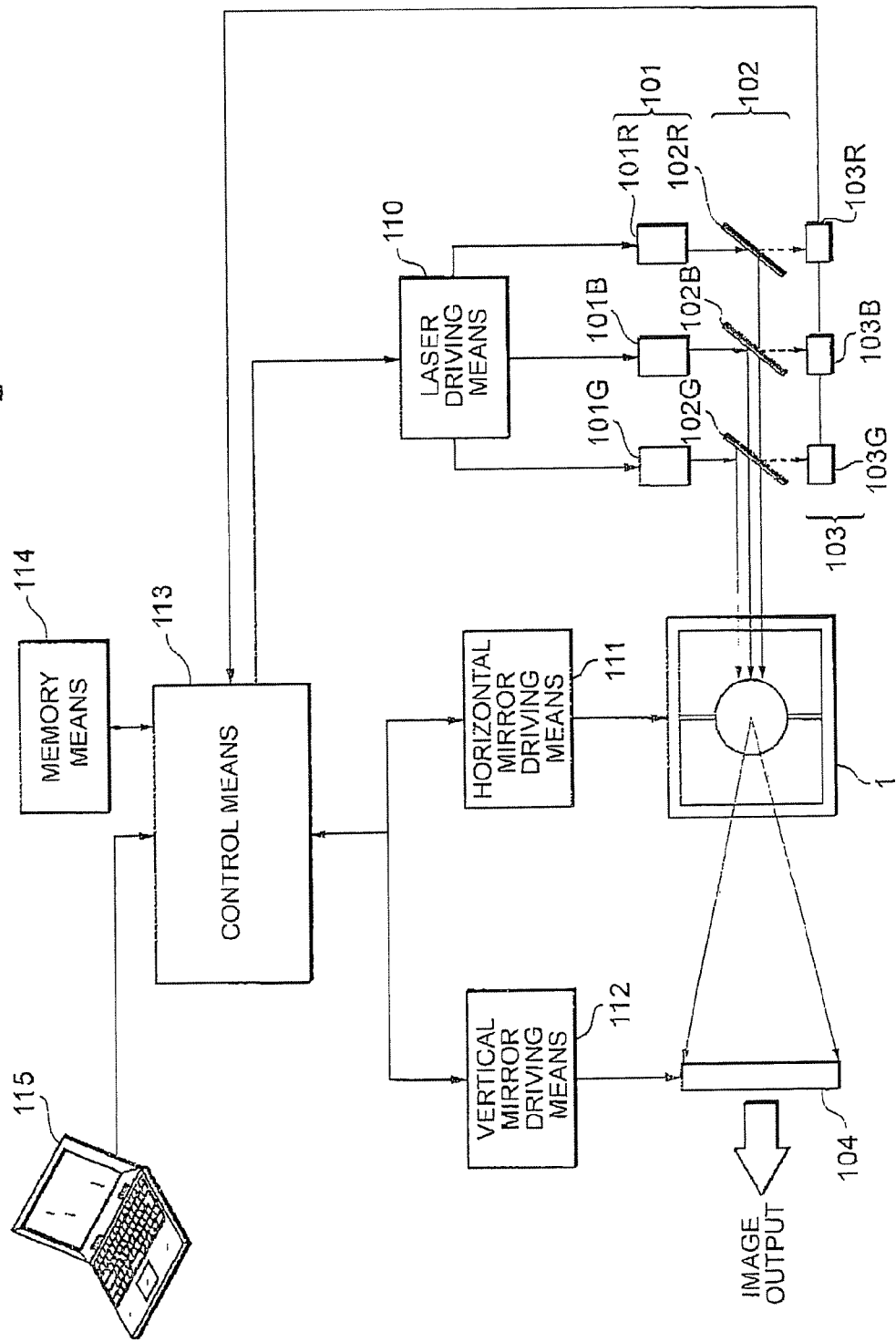

OPTICAL DEFLECTOR AND METHOD OF MANUFACTURING THE SAME

CROSS-REFERENCES TO RELATED APPLICATIONS

This is a divisional application of U.S. application Ser. No. 12/403,832 filed Mar. 13, 2009, now U.S. Pat. No. 8,331,003 issued Dec. 11, 2012 which claims priority to Japanese Patent Application No. 2008-063524, filed on Mar. 13, 2008, Japanese Patent Application No. 2008-218586, filed on Aug. 27, 2008 and Japanese Patent Application No. 2009-053350, filed on Mar. 6, 2009, the entire disclosures of which are incorporated herein by reference in their entireties.

BACKGROUND

1. Field of the Invention

The present invention relates to an optical deflector using a MEMS (Micro Electro Mechanical System) technique and a method of driving the same.

2. Description of Related Art

In recent years, there has been an increase in the development of a microactuator using a MEMS technique. For example, an optical deflector provided with a mirror supported for torsional rotation by a pair of elastic support portions (torsion bars) has been developed as a device that can form an image display device with a simple configuration.

With a recent increase in area of a mirror, the moment of inertia of the mirror has been increasing, resulting in a problem in that driving torque rises. JP-A-2004-037886 discloses a configuration of an optical scanner in which a back surface of a mirror is provided with lightening portions.

However, as described in JP-A-2004-037886, even though the back surface of the mirror being provided with the lightening portions definitely reduces the moment of inertia, there remains a problem in that elements such as a magnet, a coil and a sensor cannot be arranged on the back surface of the mirror.

SUMMARY

The present invention has been made in light of the above circumstances, and has an object to provide an optical deflector in which a moment of inertia of a movable plate is reduced, while an effective area for the movable plate having a reflecting surface is ensured and to provide a method of manufacturing the optical deflector.

In order to attain the above object, an optical deflector of the present invention includes: a movable plate having a reflecting surface and a side surface; and a support portion that supports the movable plate in such a manner that the movable plate is able to rotate around a predetermined axis, wherein the side surface of the movable plate is recessed toward the axis.

With the above configuration, the side surface of the movable plate is recessed toward the axis, whereby the moment of inertia is reduced. Here, the side surface of the movable plate corresponds to an outer edge of the movable plate, and therefore can be regarded as being distant from the rotational axis compared with the inner side of the movable plate. A moment of inertia consists of the sum of products each of which is obtained by the mass of a minute portion of an object and a square distance between that portion and an axis. Therefore, the recess is provided in the side surface of the movable plate distant from the rotational axis, providing a significantly small moment of inertia, compared with the case where a recess is provided in the front surface or back surface of the movable plate under the condition of the same mass. Moreover, no recess is provided in the front surface or back surface of the movable plate, whereby the front surface or back surface of the movable plate can be used as much as possible as a reflecting surface or mounting surface for other elements.

Preferably, the side surface of the movable plate has a predetermined crystallographic plane. Therefore, the side surface shape of the movable plate can be controlled with high precision, leading to clarity concerning a reduction amount of the moment of inertia of the movable plate. Accordingly, rotational motion of the movable plate can be controlled with high precision.

Preferably, the side surface of the movable plate has a connecting portion with respect to the support portion, and a corner portion in the vicinity of the connecting portion has a convex portion formed in a portion that is recessed toward the axis. As described above, the side surface of the movable plate at the connecting portion of the movable plate and the support portion is not wholly recessed, whereby the damage of the support portion due to stress concentration on the connecting portion is prevented. Also, this connecting portion is close to the rotational axis; therefore, even if a recess is not formed at this portion, this will not influence the effect of reducing a rotation moment to such an extent.

Also, the side surface of the movable plate has a connecting portion with respect to the support portion, and a corner portion in the vicinity of the connecting portion may have a convex portion formed in a portion that is recessed in a direction perpendicular to the axis. As described above, the side surface of the movable plate at the connecting portion of the movable plate and the support portion is not wholly recessed, whereby the damage of the support portion due to stress concentration on the connecting portion is prevented. Also, this connecting portion is close to the rotational axis; therefore, even if a recess is not formed at this portion, this will not influence the effect of reducing a rotation moment to such an extent.

Where the thickness of the movable plate is a, and the external dimension of the reflecting surface of the movable plate is b, a/b is from 0.01 to 1.4. The reason a/b is set to 1.4 or less is that penetration in a lateral direction is prevented to ensure a mirror surface. The reason a/b is set to 0.01 or more is to obtain the effect of reducing the moment of inertia of the movable plate due to the recess of the side surface of the movable plate.

Moreover, in order to attain the above object, a method of manufacturing the optical deflector of the present invention includes: forming respective masks, each of which has a predetermined pattern, on both surfaces of a substrate; and etching the substrate from both the surfaces using the masks to form a movable plate and a support portion that supports the movable plate from both sides, and in the step of forming the movable plate and the support portion, the substrate is subjected to over-etching by using wet etching to recess at least a portion, which is to be the movable plate, of a side surface of the substrate.

With the above configuration, the substrate is subjected to over-etching using by wet etching to recess at least the portion, which is to be the movable plate, of the side surface of the substrate. Accordingly, the movable plate with a reduced moment of inertia is manufactured without the addition of manufacturing steps.

Preferably, in the step of forming the masks, each of which has a predetermined pattern, on both the surfaces of the substrate, a mask having: a first mask pattern corresponding to the movable plate; a second mask pattern corresponding to the support portion; and a correction mask pattern for preventing the cross section of a connecting portion of the movable plate and the support portion from becoming smaller compared with the other portions, is formed. Accordingly, the cross section of the support portion at the connecting portion can be ensured as having a constant value or more.

Preferably, in the step of forming the masks, each of which has a predetermined pattern, on both the surfaces of the substrate, a mask having: a first mask pattern corresponding to the movable plate; a second mask pattern corresponding to the support portion; and a correction mask pattern corresponding to a connecting portion of the movable plate and the support portion and being wider than the second mask pattern, is formed. Accordingly, the cross section of the support portion at the connecting portion can be ensured as having a constant value or more.

Furthermore, it is preferable that, after the step of forming the movable plate and the support portion, applying isotropic etching to the substrate to make a ridge line portion of a predetermined crystallographic plane of the substrate round is provided.

Accordingly, the ridge line of the predetermined crystallographic plane generated in the substrate due to anisotropic etching in the step of forming the movable plate and the support portion can be made round, and therefore, stress concentration on the ridge line portion can be reduced. In particular, the damage due to stress concentration on the connecting portion of the movable plate and the support portion can be prevented.

BRIEF DESCRIPTION OF THE DRAWINGS

FIG. 30 is a schematic structural view of a display device using the optical deflector according to a third embodiment.

DETAILED DESCRIPTION OF PREFERRED EMBODIMENTS

First Embodiment

Embodiments of the present invention will hereinafter be described with reference to the accompanying drawings.

Figure 1:
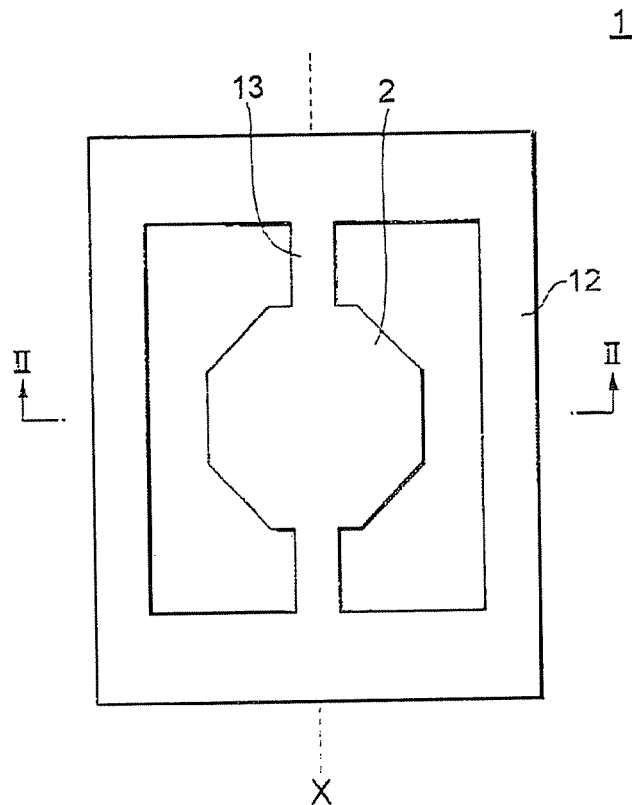
FIG. 1 is a plan view of an optical deflector according to a first embodiment.
Figure 2:
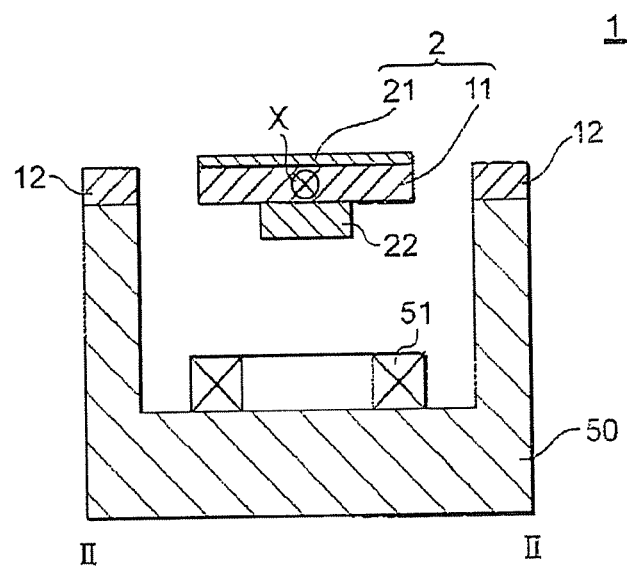
FIG. 2 is a sectional view taken along line II-II of FIG. 1.

FIG. 1 is a plan view showing a configuration for an optical deflector according to this embodiment. FIG. 2 is a sectional view taken along line II-II of FIG. 1.

The optical deflector 1 includes a movable plate 11, a support frame 12, and a pair of elastic support portions 13 that support the movable plate 11 and can be contorted in such a manner that the movable plate 11 can rotate around the support portions 13 with respect to the support frame 12. The movable plate 11, the support frame 12, and the elastic support portions 13 are integrally formed by subjecting, e.g., a silicon substrate to etching processing. A reflective film 21 is formed on a front surface of the movable plate 11. Accordingly, a mirror 2 composed of the movable plate 11 and the reflective film 21 is configured.

A magnet 22 is attached to a back surface of the movable plate 11 via a adhesive (not shown). The magnet 22 is magnetized in a direction orthogonal to axis X that is a rotation center axis of the movable plate 11 in a plan view. More specifically, the magnet 22 has a pair of magnetic poles that differ in polarity and are opposed to each other with respect to axis X. The support frame 12 is attached to a holder 50, and a coil 51 for driving the movable plate 11 is arranged on the holder 50.

In the above oscillation mirror 1, a periodically-changing current (alternating current) is supplied to the coil 51, whereby the coil 51 alternately generates an upward magnetic filed (on the movable plate 11 side) and a downward magnetic field. This causes torsional deformation of the elastic support portions 13 such that one of the pair of magnetic poles of the magnet 22 comes close to the coil 51, while the other magnetic pole is distant from the coil 51, whereby the movable plate 11 can rotate around X-axis.

FIG. 2 shows the oscillation mirror of a drive system utilizing an electromagnetic force between the magnet 22 and the coil 51. However, the present invention may employ a system utilizing electrostatic attraction or a system utilizing a piezoelectric element. For example, the system utilizing electrostatic attraction does not need the magnet 22, and one or plural electrodes opposed to the movable plate 11 is(are) placed in place of the coil 51. Electrostatic attraction is then effected between the movable plate 11 and the electrode(s) by applying a periodically-changing alternating voltage between the movable plate 11 and the electrode(s). As a result, the movable plate 11 can rotate around X-axis, while the elastic support portions 13 are being deformed with torsion.

Figure 3:
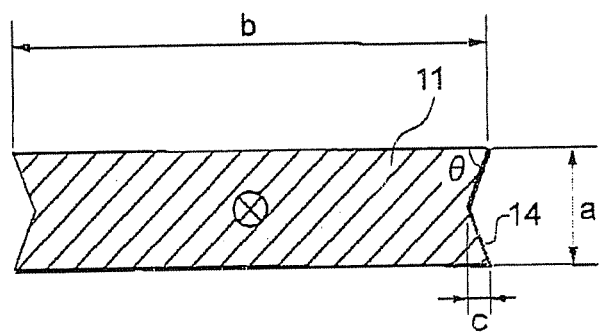
FIG. 3 is a sectional view showing a detailed configuration for a movable plate.

FIG. 3 is a sectional view showing a detailed configuration for the movable plate 11.

As shown in FIG. 3, in this embodiment, a side surface 14 of the movable plate 11 is recessed toward the rotational axis X. Specifically, when the movable plate 11 is formed using a Si wafer having a (100) surface as its principal surface, the side surface 14 of the movable plate 11 is composed of a Si(111) surface. An angle θ between the Si(111) surface and the principal surface is 54.73°.

In the above configuration, the side surface 14 of the movable plate 11 is recessed toward the axis, whereby the moment of inertia is reduced. Here, the side surface 14 serving as an outer edge of the movable plate 11 can be regarded as being distant from the rotational axis X compared with the inner side of the movable plate 11. A moment of inertia consists of the sum of products each of which is obtained by the mass of a minute portion of an object and a square distance between that portion and an axis. Therefore, the recess is provided in the side surface 14 of the movable plate 11 distant from the rotational axis X, providing a significantly small moment of inertia compared with the case where a recess is provided in the front surface or back surface of the movable plate 11 under the condition of the same mass. Moreover, no recess is provided in the front surface or back surface of the movable plate 11, whereby the front surface or back surface of the movable plate 11 can be used as much as possible as a reflecting surface or mounting surface for other elements. As shown in FIG. 2, for example, the magnet 22 is fixed to the back surface of the movable plate 11.

Here, where the thickness of the movable plate is a, and the external dimension of the reflecting surface of the movable plate is b, a/b is preferably from 0.01 to 1.4. The reason a/b is set to 1.4 or less is because a/b of 1.4 or less is needed to avoid penetration in a lateral direction to ensure a mirror surface. For example, it is assumed that, when the external dimension of the mirror b and the thickness a are set, an etching amount in a lateral direction is set to c, and θ is set to 54.73°. Here, the condition of expression (1) below needs to be satisfied to avoid penetration in a lateral direction, and as shown in FIG. 3, c is expressed by expression (2) below. Expression (1) below applies. Based on expressions (1) and (2) below, a/b is 1.4 or less, as shown in equation (3) below.

$$b \geq 2c \tag{1}$$

$$(a/2)/c = \tan 54.73 \tag{2}$$

$$a/b \leq 1.4 \tag{3}$$

The reason a/b is set to 0.01 or more is that the side surface of the movable plate having the above dimension is recessed, increasing the effect of reducing the moment of inertia of the movable plate. For example, in relation to a mirror having a thickness: a=150 μm and an external dimension: b=2000 μm, a movable plate having its side surface not being recessed is regarded as a comparative example, while a movable plate having, as its side surface, a (111) surface being recessed is regarded as an embodiment. As a result of a simulation of a moment of inertia with the above conditions, the moment of inertia in the comparative example was $2.97 \times 10^{-13}$ kgm$^2$; on the other hand, the moment of inertia in this embodiment was $2.40 \times 10^{-13}$ kgm$^2$. This resulted in (the moment of inertia in this embodiment/the moment of inertia in the comparative example)×100=81%, and it was confirmed that the moment of inertia reduced by about 20%.

A method of manufacturing the optical deflector 1 according to the above embodiment will hereinafter be described with reference to FIGS. 4 to 18.

Figure 4:
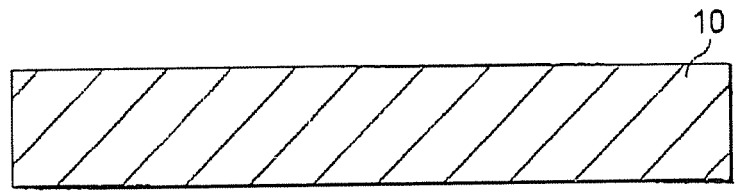
FIG. 4 is a step sectional view showing a method of manufacturing the optical deflector according to the first embodiment.
Figure 5:
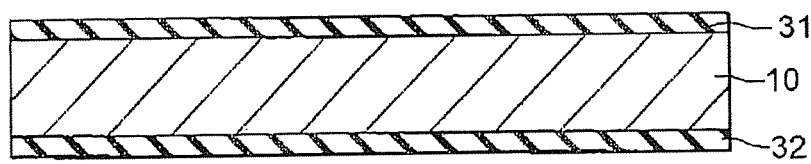
FIG. 5 is a step sectional view showing the method of manufacturing the optical deflector according to the first embodiment.

As shown in FIG. 4, a substrate 10 made of, e.g., silicon is prepared. Also, as shown in FIG. 5, masks 31 and 32 made of silicon oxide are respectively formed on both the surfaces of the substrate 10 via thermal oxidation.

Figure 6:
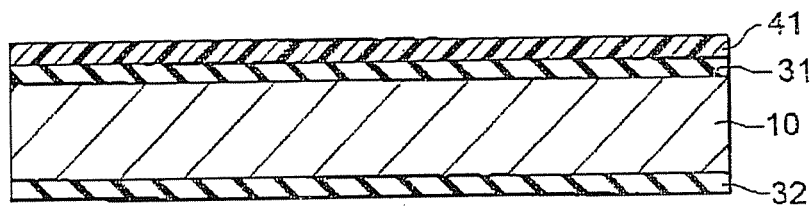
FIG. 6 is a step sectional view showing the method of manufacturing the optical deflector according to the first embodiment.
Figure 7:
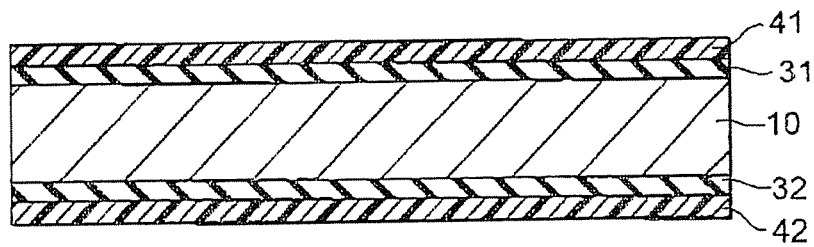
FIG. 7 is a step sectional view showing the method of manufacturing the optical deflector according to the first embodiment.

Next, as shown in FIG. 6, a resist 41 is formed on the mask 31 on the front surface side of the substrate 10. The resist may be positive or negative. Subsequently, as shown in FIG. 7, a resist 42 is formed on the mask 32 on the back surface side of the substrate 10.

Figure 8:
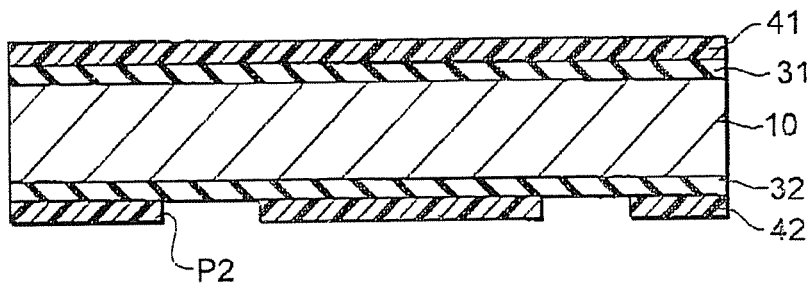
FIG. 8 is a step sectional view showing the method of manufacturing the optical deflector according to the first embodiment.

As shown in FIG. 8, the resist 42 on the back surface side of the substrate 10 is then subjected to exposure and development, applying a predetermined opening pattern P2 to the resist 42. The opening pattern P2 is, for example, a pattern for opening an area other than the area for the movable plate 11, the support frame 12 and the elastic support portions 13.

Figure 9:
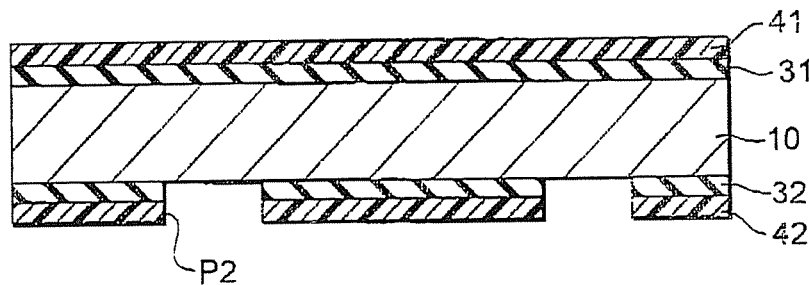
FIG. 9 is a step sectional view showing the method of manufacturing the optical deflector according to the first embodiment.

Next, as shown in FIG. 9, the mask 32 on the back surface side is subjected to etching with the resist 42 serving as a mask. As a result, the opening pattern P2 applied to the resist 42 is transferred to the mask 32. Etching for the mask 32 employs, e.g., buffered HF (BHF).

Figure 10:
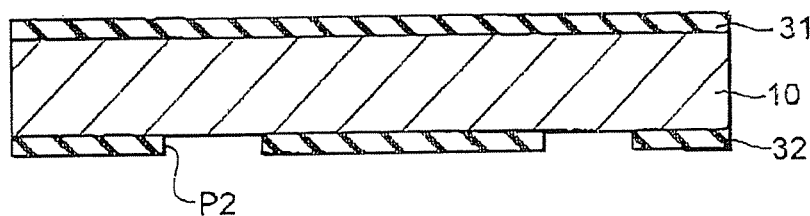
FIG. 10 is a step sectional view showing the method of manufacturing the optical deflector according to the first embodiment.

Next, as shown in FIG. 10, the resists 41 and 42 on both the surfaces of the substrate are removed. Sulfate cleaning or ashing is employed for the removal of the resists 41 and 42.

Figure 11:
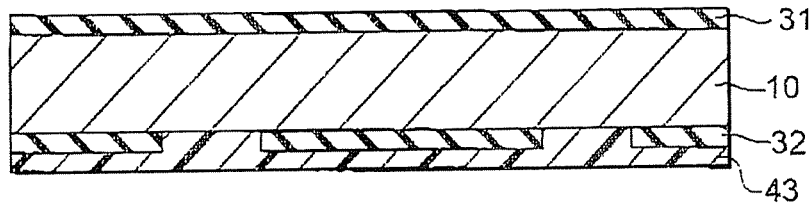
FIG. 11 is a step sectional view showing the method of manufacturing the optical deflector according to the first embodiment.
Figure 12:
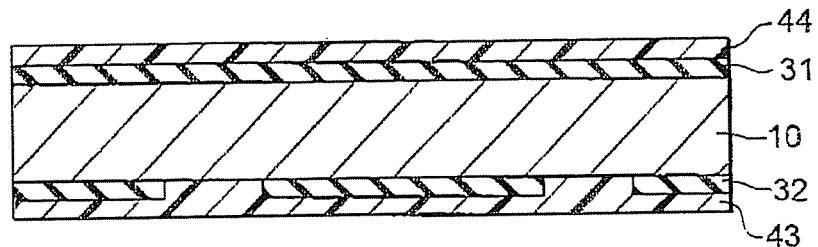
FIG. 12 is a step sectional view showing the method of manufacturing the optical deflector according to the first embodiment.

As shown in FIG. 11, resist formation is conducted again on the back surface side of the substrate 10 using a resist 43. Also, as shown in FIG. 12, resist formation is conducted again on the front surface side of the substrate 10 using a resist 44.

Figure 13:
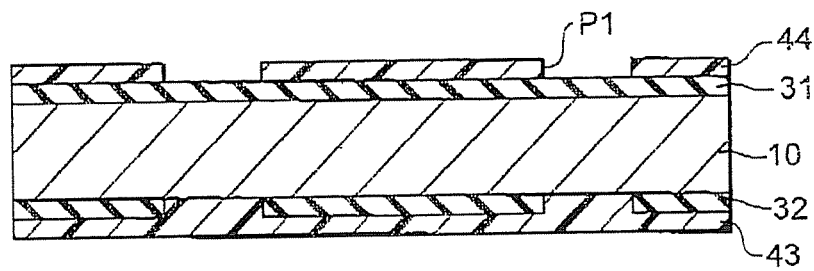
FIG. 13 is a step sectional view showing the method of manufacturing the optical deflector according to the first embodiment.

As shown in FIG. 13, the resist 44 on the front surface side of the substrate 10 is subjected to exposure and development, applying a predetermined opening pattern P1 to the resist 44. The opening pattern P1 is made equal to, for example, the opening pattern P2.

Figure 14:
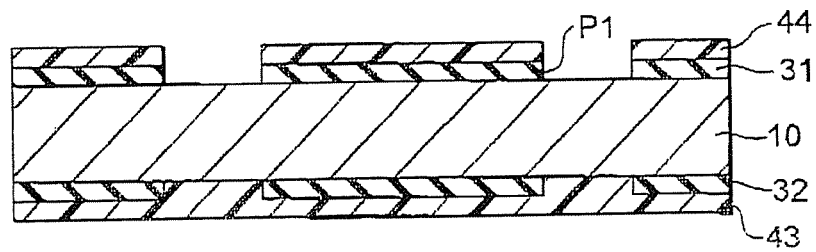
FIG. 14 is a step sectional view showing the method of manufacturing the optical deflector according to the first embodiment.

As shown in FIG. 14, the mask 31 on the front surface side is subjected to etching with the resist 44 serving as a mask. As a result, the opening pattern P1 applied to the resist 44 is transferred to the mask 31. Etching of the mask 31 employs, e.g., buffered HF (BHF).

Figure 15:
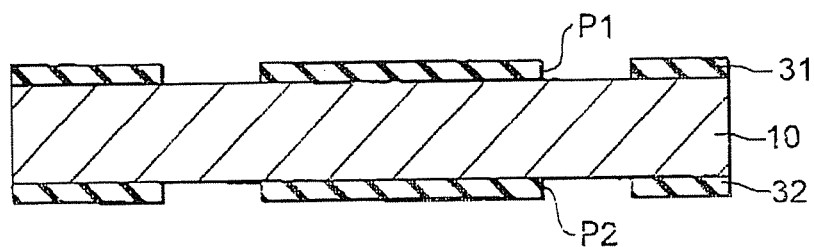
FIG. 15 is a step sectional view showing the method of manufacturing the optical deflector according to the first embodiment.

Next, as shown in FIG. 15, the resists 43 and 44 on both the surfaces of the substrate are removed. Sulfate cleaning or ashing is employed for the removal of the resists 43 and 44.

Figure 16:
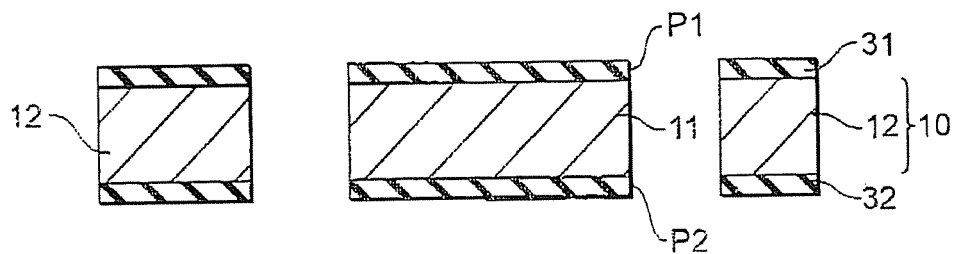
FIG. 16 is a step sectional view showing the method of manufacturing the optical deflector according to the first embodiment.

Then, as shown in FIG. 16, the substrate 10 is subjected to etching using the masks 31 and 32. As a result, through holes are formed in the substrate 10, whereby patterns for the movable plate 11, the support frame 12 and the elastic support portions 13 are formed. Etching of the substrate 10 employs wet etching using, e.g., KOH.

Figure 17:
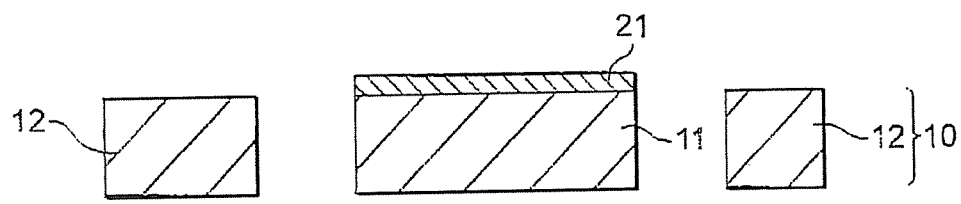
FIG. 17 is a step sectional view showing the method of manufacturing the optical deflector according to the first embodiment.

Next, as shown in FIG. 17, after the removal of the masks 31 and 32, a metal film is deposited on the front surface of the substrate 10, and is subjected to patterning, forming the reflective film 21 on the movable plate 11. Examples of metal film deposition methods include vacuum evaporation, sputtering, electroplating, electroless plating and bonding of metal foil. Note that the mask 31 and the mask 32 may be left without being removed.

Figure 18:
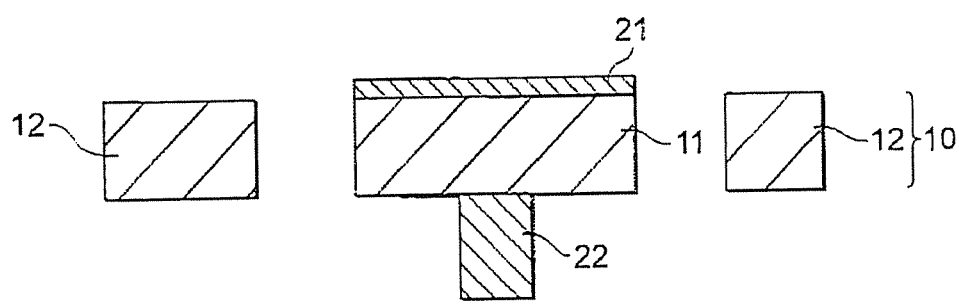
FIG. 18 is a step sectional view showing the method of manufacturing the optical deflector according to the first embodiment.

Subsequently, as shown in FIG. 18, the magnet 22 is attached to the back surface of the movable plate 11 via the adhesive (not shown).

In the subsequent step, a structure, which is manufactured by using one substrate as described above and which includes the movable plate 11, the support frame 12 and the elastic support portions 13, is attached to the holder 50, thereby manufacturing the optical deflector 1.

The overall manufacturing process of the method of manufacturing the optical deflector 1 according to this embodiment has been described above. A method of recessing a side surface 14a of the movable plate 11 will hereinafter be described in detail with reference to FIGS. 19A to 22B. In FIGS. 19A to 22B, FIGS. 19A, 20A, 21A, and 21A each are a sectional view of the substrate 10, and FIGS. 19B, 20B, 21B and 22B each are a surface view of the substrate 10.

Figure 19A:
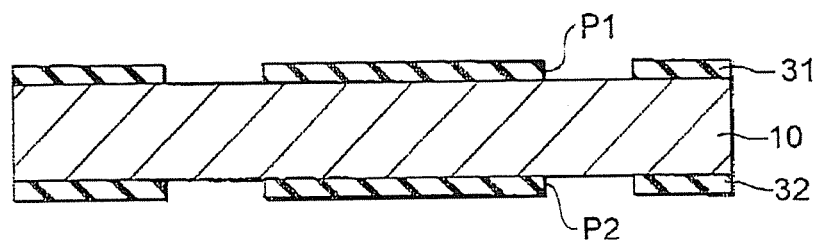
FIGS. 19A and 19B are step sectional views showing the method of manufacturing the optical deflector according to the first embodiment.
Figure 19B:
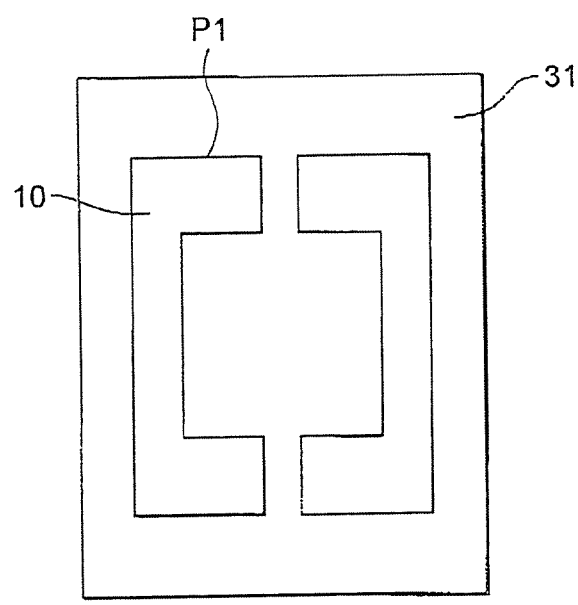
Figure 20A:
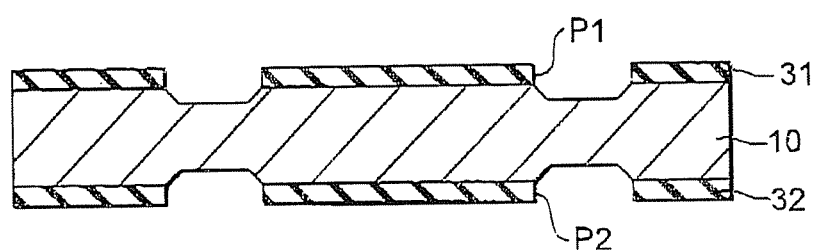
FIGS. 20A and 20B are step sectional views showing the method of manufacturing the optical deflector according to the first embodiment.
Figure 20B:
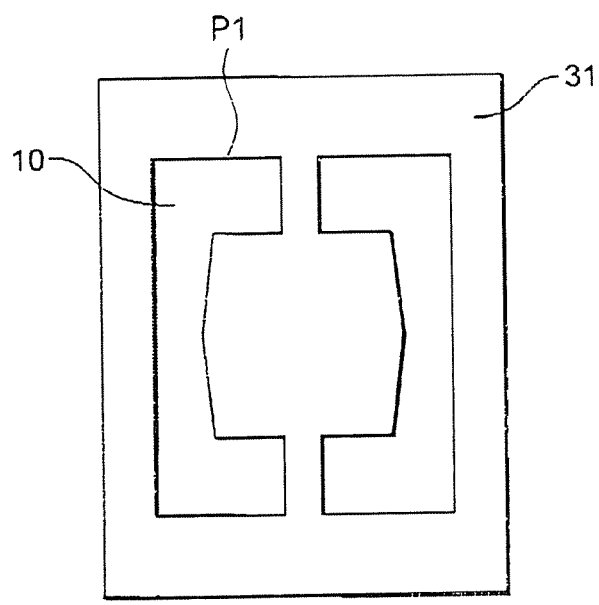

FIGS. 19A and 19B are respectively a sectional view and a surface view obtained after the mask 31 and the mask 32 for desired patterns are formed respectively on the front and back surfaces of the substrate 10. The sectional view of FIG. 19A corresponds to FIG. 15. The descriptions below are for the case of using, e.g., the substrate 10 composed of a Si wafer which has a (100) surface serving as its principal surface. As shown in FIGS. 20A and 20B, when conducting wet etching using KOH on the substrate 10, etching begins to progress from both the surfaces of the substrate 10. When employing wet etching, the portions of the substrate 10 which are exposed in accordance with the opening patterns P1 and P2 are etched to have, e.g., tapered shapes.

Figure 21A:
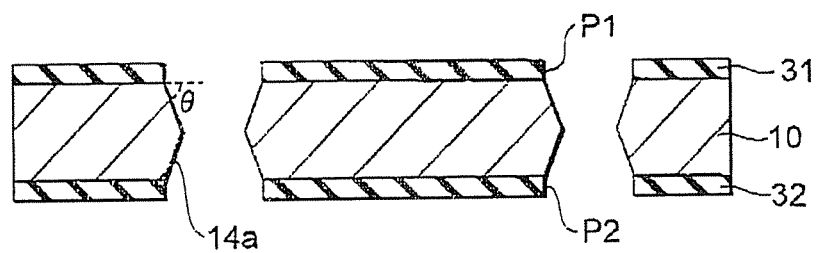
FIGS. 21A and 21B are step sectional views showing the method of manufacturing the optical deflector according to the first embodiment.
Figure 21B:
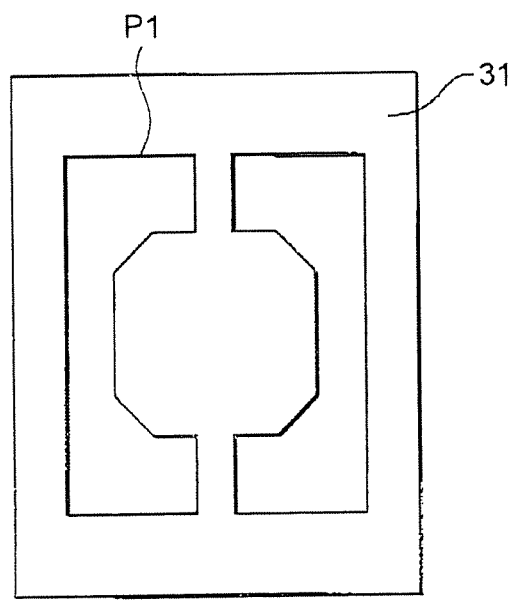

As shown in FIGS. 21A and 21B, the bottom of each of the holes formed by etching conducted from the front surface of the substrate 10 and the bottom of each of the holes formed by etching conducted from the back surface of the substrate 10 contact each other, thereby forming a hole that penetrates the substrate 10. At this point, in wet etching with KOH or the like, a Si crystallographic plane orientation (111) surface functions as an etching stopper, and therefore, a side surface composed of faces each having an angle θ which is equal to 54.73° with respect to each surface is formed automatically. As shown in FIG. 21, in general, after processing the substrate 10 by wet etching, the side surface 14a of the substrate 10 is convex oppositely from the axis.

Figure 22A:
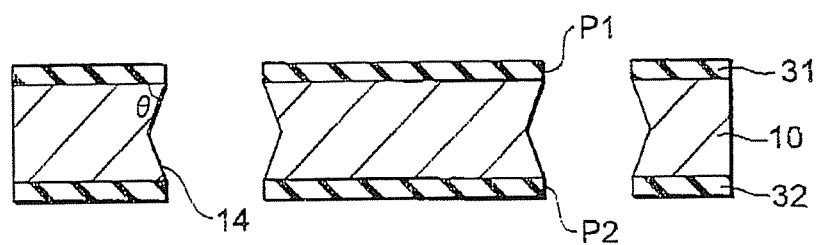
FIGS. 22A and 22B are step sectional views showing the method of manufacturing the optical deflector according to the first embodiment.
Figure 22B:
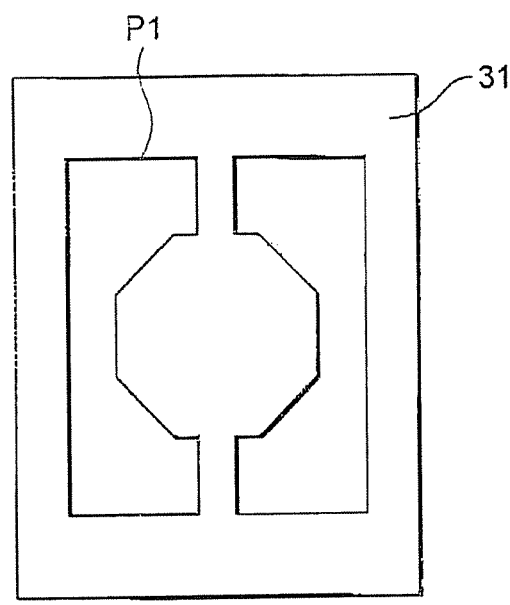

In this embodiment, as shown in FIGS. 22A and 22B, the substrate 10 is subjected to over-etching, whereby the side surface of the substrate 10 is etched to obtain the (111) surface inside with the effective area of the reflecting surface of the mirror being retained. As a result, as shown in FIGS. 22A and 22B, the side surface 14 recessed toward the axis side is obtained. This side surface 14 is automatically formed by managing the temperature, concentration and etching time of a wet etching solution.

In the optical deflector 1 according to the above embodiment, because the side surface 14 of the movable plate 11 is recessed, a large effect of reducing a moment of inertia can be obtained compared with the case of the recess provided in the front surface or back surface of the movable plate 11 under the condition of the same mass. Also, a recess is not provided on the front surface or back surface of the movable plate 11, whereby the front surface or back surface of the movable plate 11 can be used as much as possible as a reflecting surface or a mounting surface for other elements.

As described above, the moment of inertia of the mirror 2 can be reduced without changing the effective area of the mirror 2, and therefore, the stress applied on springs (elastic support portions 13) during rotation can be decreased. As a result, the elastic support portions 13 can be prevented from being damaged.

Also, the reduction of the moment of inertia can shorten the length of each of the elastic support portions 13 that realize the same resonance frequency, thereby achieving miniaturization and also the prevention of an appearance of a mode other than torsion in the vicinity of a driving frequency. A large deflection angle can also be realized.

Moreover, with the method of manufacturing the optical deflector 1 according to this embodiment, the substrate 10 is subjected to over-etching by employing wet etching to recess at least the portion, which is to configure the movable plate 11, of the side surface of the substrate 10, whereby the movable plate 11 with a reduced moment of inertia can be manufactured without adding manufacturing steps.

Furthermore, after the substrate 10 is subjected to wet etching as described above, a ridge line portion of the crystallographic plane of the substrate 10 may be made round by conducting isotropic etching on the substrate 10. The (111) surface that emerges as a result of wet etching (anisotropic etching) on the substrate 10 is formed to have an angle between adjacent faces of 109.47°. The connecting portion of the movable plate 11 and the support frame 12 may be damaged due to stress concentration generated in a corner (ridge line portion) of the connecting portion. The corner can be made round by subjecting the substrate 10 to isotropic etching, and therefore, the stress concentration on the corner portion can be reduced. As a result, the damage of the connecting portion of the movable plate 11 and the support frame 12 due to stress concentration can be prevented.

Note that, when conducting isotropic etching on the substrate 10, it is desirable to adjust the masks 31 and 32 in advance during wet etching so that the respective patterns for the movable plate 11, the support frame 12 and the elastic support portions 13 are formed a little larger in order to adjust the reduction of the entire substrate 10 due to isotropic etching.

Second Embodiment

In wet etching of the substrate 10, the connecting portion of the portion corresponding to the movable plate 11 and the portion corresponding to each of the elastic support portions 13 forms corner portions, and etching in the corner portions may progress faster than etching in other areas. The second embodiment is intended to prevent excessive etching in the corner portions.

A method of manufacturing the optical deflector 1 according to the second embodiment and a method of manufacturing the optical deflector 1 will be described with reference to FIGS. 23 to 28. FIGS. 23 to 28 are surface views for an etching process for the substrate 10.

Figure 23:
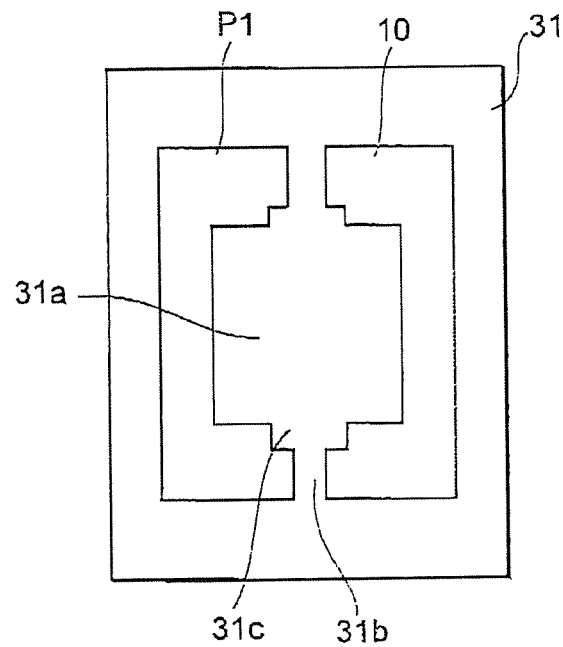
FIG. 23 is a step sectional view showing the method of manufacturing the optical deflector according to a second embodiment.

As shown in FIG. 23, in this embodiment, a mask 31, which has: a first mask pattern 31a corresponding to the movable plate 11; a second mask pattern 31b corresponding to the elastic support portions 13; and a correction mask pattern 31c for preventing the cross section perpendicular to a rotational axis of a connecting portion of the movable plate 11 and each of the elastic support portions 13 becoming from smaller compared with the other portions, is formed on the front surface of the substrate 10. Note that a mask 32 having the same pattern as the mask 31 on the front surface side is formed on the back surface of the substrate 10. As shown in the figure, the correction mask pattern 31c is formed such that the width in a direction orthogonal to the rotational axis is wider than the second mask pattern 31b and is narrower than the first mask pattern 31a.

Figure 24:
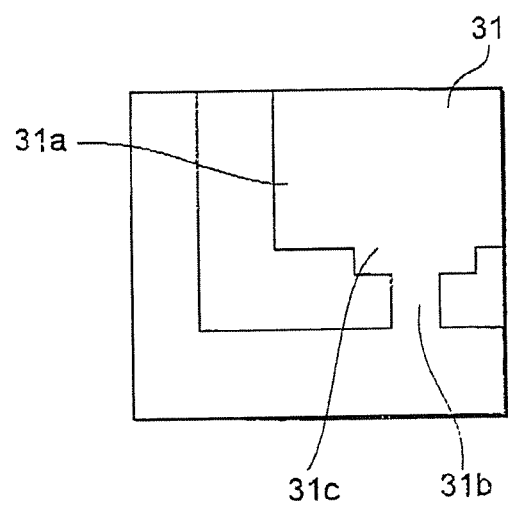
FIG. 24 is a step sectional view showing the method of manufacturing the optical deflector according to the second embodiment.
Figure 25:
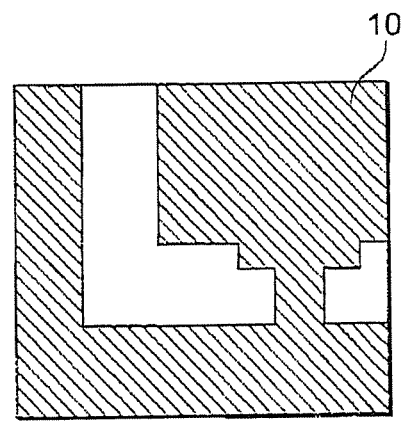
FIG. 25 is a step sectional view showing the method of manufacturing the optical deflector according to the second embodiment.
Figure 26:
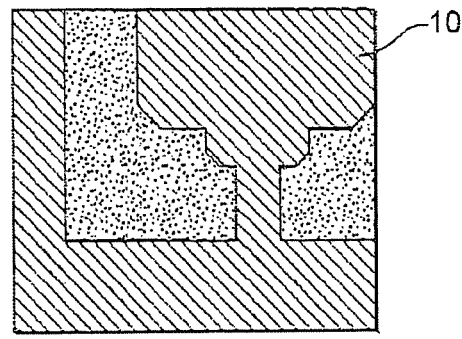
FIG. 26 is a step sectional view showing the method of manufacturing the optical deflector according to the second embodiment.
Figure 27:
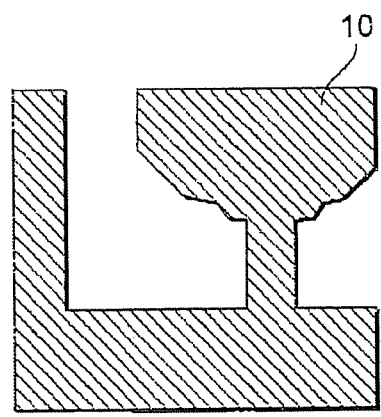
FIG. 27 is a step sectional view showing the method of manufacturing the optical deflector according to the second embodiment.
Figure 28:
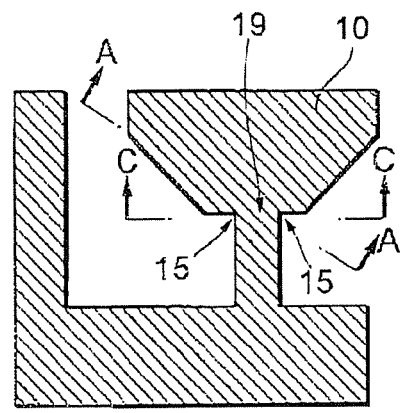
FIG. 28 is a step sectional view showing the method of manufacturing the optical deflector according to the second embodiment.

FIG. 24 is an enlarged view of the mask at the connecting portion of the movable plate and the elastic support portion, and FIG. 25 is an enlarged surface view of the substrate under the mask 31. FIGS. 26 to 28 each are an enlarged view of the connecting portion of the substrate 10 in the progress of etching. FIG. 26 shows the start of etching, FIG. 27 shows penetration of the substrate due to etching, and FIG. 28 shows the state obtained after over-etching.

Figure 29A:
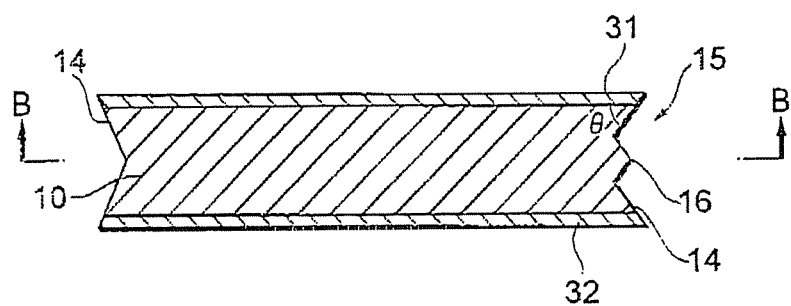
FIG. 29A, FIG. 29B and FIG. 29C are step sectional views showing the method of manufacturing the optical deflector according to the second embodiment.
Figure 29B:
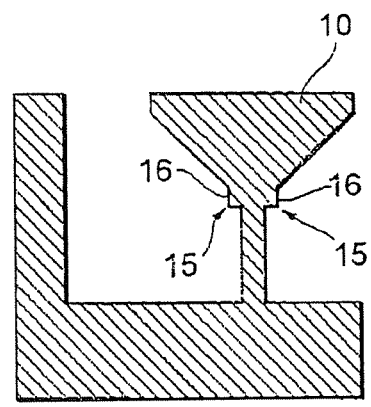
Figure 29C:
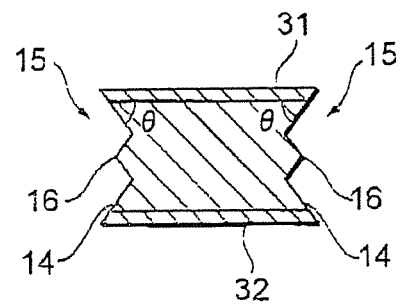

FIG. 29A shows an A-A section related to FIG. 28. Also, FIG. 29B shows a B-B section related to FIG. 29A. More specifically, FIG. 29B shows a cross section parallel to the plane shown in FIG. 28. FIG. 29C shows a C-C section related to FIG. 28. As shown in FIG. 22, the substrate 10 is subjected to over-etching, whereby a side surface 14 recessed toward the axis is formed. However, by performing etching with the provision of the correction mask pattern 31c, the side surface 14 is recessed toward the axis, while convex portions 16 are formed respectively in the recesses in the corner portions 15 in the vicinity of the connecting portion 19 of the movable plate 11 and the elastic support portion 13, as shown in FIGS. 29A, 29B and 29C.

By providing the correction pattern 31c in advance as described above, the cross section of the connecting portion 19 of the movable plate 11 and the elastic support portion 13 can be prevented from becoming smaller compared with the other portions. Accordingly, the rigidity of the elastic support portion 13 can be retained while reducing the moment of inertia. Note that, in each of the convex portions 16, besides the Si(111) surface, a (110) surface, (100) surface, (212) surface, (331) surface, (311) surface, (131) surface, (411) surface, (141) surface, etc., may emerge depending on the etching condition and the shape of the correction mask pattern 31c. Alternatively, a surface equivalent to any of theses surfaces may emerge.

As described above, the mask 31 having the correction mask pattern 31c at the corner portions 15 in the vicinity of the connecting portion 19 of the movable plate 11 and the elastic support portion 13 is formed, whereby even when etching progresses faster at the corner portions 15 compared with the other portions, the cross section of the connecting portion 19 of the movable plate 11 and the elastic support portion 13 can be ensured. Also, by providing the correction mask pattern 31c, the side surface 14 of the substrate 10 is recessed toward the axis while each of the convex portions 16 is formed in the recess in the connecting portion 19. Therefore, the stress concentration on the connecting portion 19 can be controlled, leading to prevention of damage of the elastic support portion 13. Furthermore, the connecting portion 19 is close to the rotational axis; therefore, even if the connecting portion 19 does not have a recess toward the axis, this will not influence the effect of reducing a rotation moment to such an extent.

Third Embodiment

A projection type display device will be described as an application of the optical deflector 1 according to this embodiment. FIG. 30 is a diagram of a schematic configuration for a projection type display device. An optical scanner in FIG. 30 employs the optical deflector 1 shown in FIG. 1 as a horizontal scanning mirror.

The optical scanner in FIG. 30 includes, in addition to the optical deflector 1, laser light sources 101, dichroic mirrors 102, photodiodes 103 and a vertical mirror 104.

The laser light sources 101 include a red laser light source 101R that emits red laser light, a blue laser light source 101B that emits blue laser light and a green laser light source 101G that emits green laser light. Note that laser light sources for two or less colors or laser light sources for four or more colors may be used.

The dichroic mirrors 102 include a dichroic mirror 102R that reflects the red laser light from the red laser light source 101R, a dichroic mirror 102B that reflects the blue laser light and transmits the red laser light, and a dichroic mirror 102G that reflects the green laser light and transmits the blue laser light and red laser light. These three types of dichroic mirrors 102 have synthetic light of the red laser light, blue laser light and green laser light incident on the oscillation mirror 1.

The photodiodes 103 detect light amounts of the red laser light, green laser light, and blue laser light that have not been reflected by and that have been transmitted by the dichroic mirrors 102R, 102G and 102B, respectively.

The optical deflector 1 scans the laser light from the dichroic mirrors 102 in a horizontal direction (vertical direction with respect to the axis X). The optical deflector 1 is a resonance mirror formed by MEMS, as described above.

The vertical mirror 104 scans the laser light reflected by the optical deflector 1 in a vertical direction. The vertical mirror 104 is composed of, e.g., a galvanometer mirror. The galvanometer mirror is a deflector in which: an axis is provided to a mirror; and a rotation angle of the mirror can vary in accordance with electric oscillation. The optical deflector 1 performs horizontal scanning with laser light, and the vertical mirror 104 performs vertical scanning with laser light, whereby an image is displayed.

The photo scanner according to this embodiment further includes, as a driving system for the laser light sources 101, the oscillation mirror 1 and the vertical mirror 104, laser driving means 110 for driving the laser light sources 101, horizontal mirror driving means 111 for driving the optical deflector 1, vertical mirror driving means 112 for driving the vertical mirror 104, control means 113 for controlling the entire operation and memory means 114.

The control means 113 controls operations of the laser driving means 110, the horizontal mirror driving means 111 and the vertical mirror driving means 112 to display images based on image information sent from image sources 115 from a personal computer, a portable telephone, or the like.

The memory means 114 is composed of, for example, ROM containing various programs, RAM containing variations, etc., and non-volatile memory.

The optical deflector 1 according to this embodiment is utilized in a display device, achieving a display device with satisfactory display performance.

Fourth Embodiment

Figure 31A:
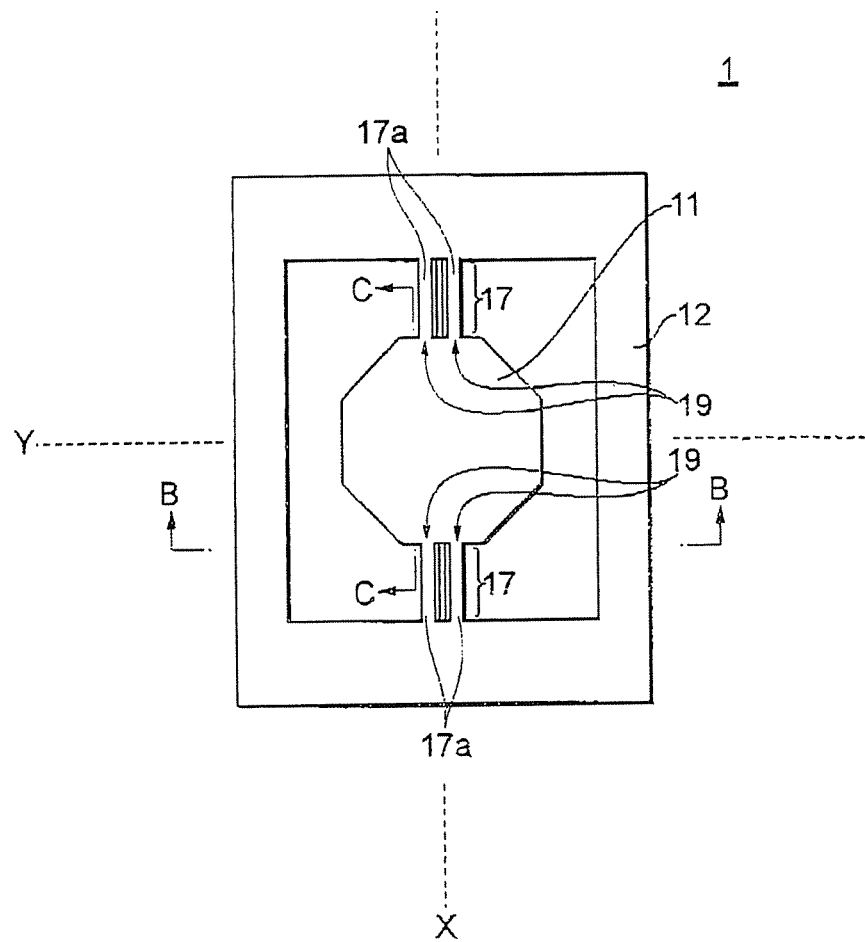
FIG. 31A is a top view showing a schematic configuration of the optical deflector according to a fourth embodiment.
Figure 31B:
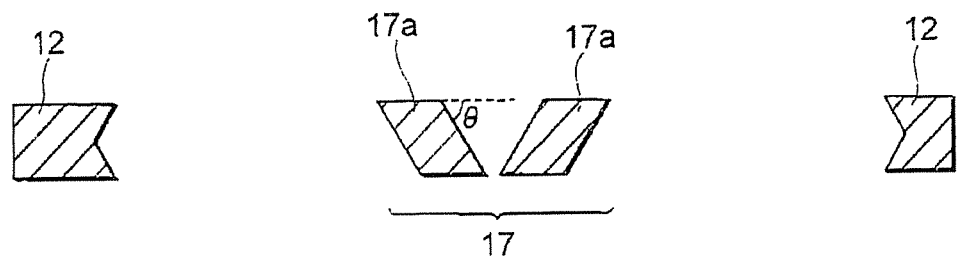
FIG. 31B is a B-B sectional view of FIG. 31A.

FIG. 31A is a top view showing a schematic configuration of the optical deflector 1 according to a fourth embodiment, and FIG. 31B is a B-B sectional view related to FIG. 31A. Note that FIG. 31B only shows the support frame 12 and elastic support portions 17 of the optical deflector 1. As shown in the figures, in this embodiment, each of the elastic support portions 17 is composed of two bars 17a. The bars 17a each have a cross section having a parallelogram shape, and the bars 17a are arranged such that the distance between those bars becomes wider toward the upper surface side. Here, θ which is equal to 54.73° is employed in the figure.

Figure 32:
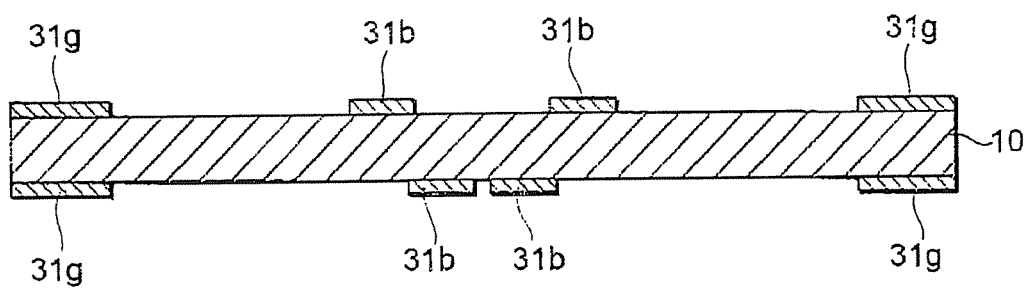
FIG. 32 is a view showing the method of manufacturing the optical deflector according to the fourth embodiment.
Figure 33:
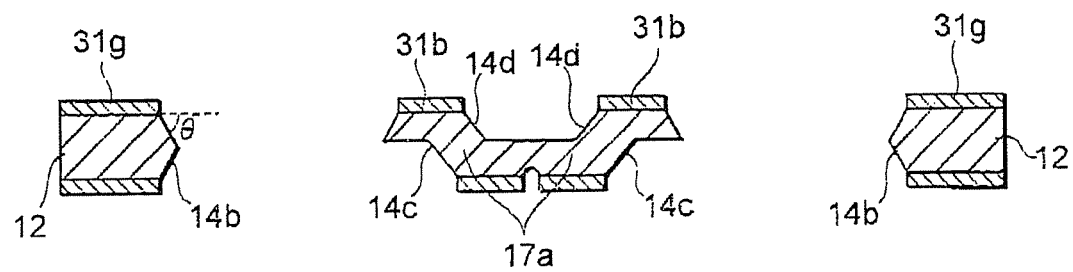
FIG. 33 is a view showing the method of manufacturing the optical deflector according to the fourth embodiment.

A method of manufacturing the optical deflector 1 according to the fourth embodiment will be described using FIGS. 32 and 33. FIGS. 32 and 33 each show a section similar to that of FIG. 31B. First, an etching mask for patterns corresponding to the movable plate 11, the support frame 12 and the elastic support portions 17 is formed on each of the front and back surfaces of the substrate 10. FIG. 32 shows a mask pattern 31g corresponding to the support frame 12 and the mask pattern 31b corresponding to the elastic support portions 17.

Next, the substrate is subjected to wet etching using KOH. The holes formed by etching respectively from the front and back surfaces of the substrate 10 become continuous with each other, thereby forming a hole that penetrates the substrate 10. In wet etching with KOH or the like, a Si crystallographic plane orientation (111) surface functions as an etching stopper, and therefore, a side surface composed of faces each having an angle θ which is equal to 54.73° with respect to each surface is formed automatically. As shown in FIG. 33, a side surface 14b of the support frame 12 is formed in a convex shape towards the opposite side of the axis. Also, each of outer side surfaces 14c of the respective bars 17a of each of the elastic support portions 17 has a convex portion left on the front surface side of the substrate 10. Each of inner side surfaces 14d of the respective bars 17a of each of the elastic support portions 17 has a convex portion left on the back surface side of the substrate 10. At this point, penetration has not been made between the two bars 17a. As described above, the hole is formed by etching in accordance with the mask patterns formed on the front and back surfaces of the substrate 10.

Moreover, the substrate 10 is subjected to over-etching, whereby the side surface of the substrate 10 is etched to obtain the (111) surface inside. As a result, as shown in FIG. 31B, the side surface 14b of the support frame 12 is in the state of being recessed toward the axis. Also, the respective convex portions of the outer side surface 14c and the inner side surface 14d of the bar 17a are etched, whereby penetration is made between the two bars 17a.

Figure 34A:
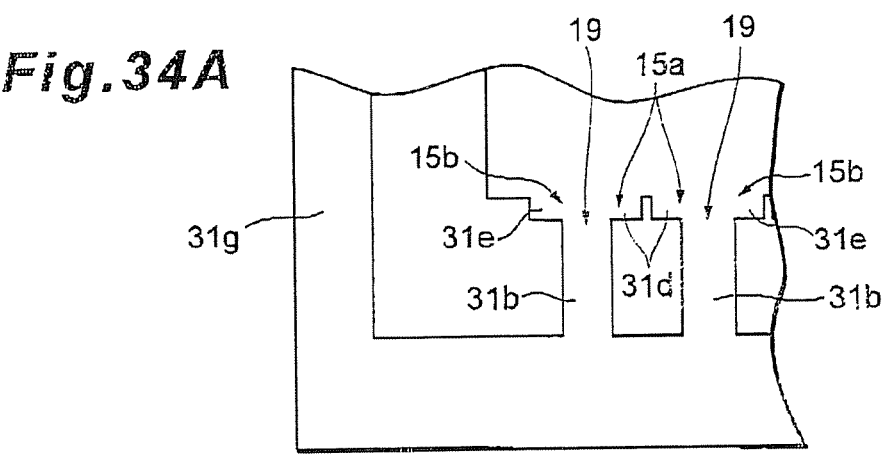
FIG. 34A and FIG. 34B are views showing the method of manufacturing the optical deflector according to the fourth embodiment.
Figure 34B:
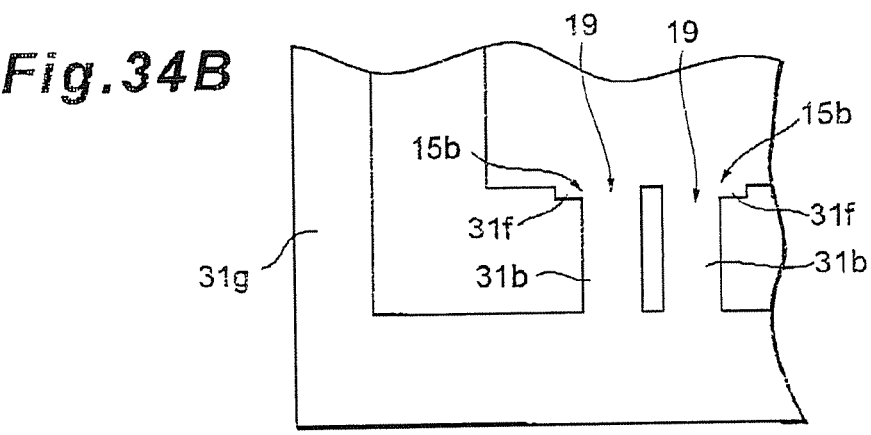

Furthermore, as in the second embodiment, etching masks each including a correction mask pattern for preventing the cross section of each of the connecting portions of the movable plate 11 and the two bars 17a of the elastic support portion 17 from becoming smaller compared with the other portions may be formed for etching. FIG. 34A is a diagram showing a mask pattern including the correction mask pattern on the front surface of the substrate 10, and FIG. 34B is a diagram showing a mask pattern including the correction mask pattern on the back surface of the substrate 10. Note that FIGS. 34A and 34B each only show the area around connecting portions 19 of the movable plate 11 and the two bars 17a of the elastic support portion 17. A correction mask pattern 31d provided on the front surface of the substrate 10 is arranged in an area corresponding to inner corner portions 15a in the vicinity of the connecting portions 19. A correction mask pattern 31e provided on the front surface of the substrate 10 is arranged in an area corresponding to outer corner portions 15b in the vicinity of the connecting portions 19. A correction mask pattern 31f provided on the back surface of the substrate 10 is arranged in an area corresponding to the outer corner portions 15b in the vicinity of the connecting portions 19. The correction mask patterns 31d, 31e and 31f have rectangular shapes, but have different ratios of length between longitudinal and lateral sides.

Figure 35:
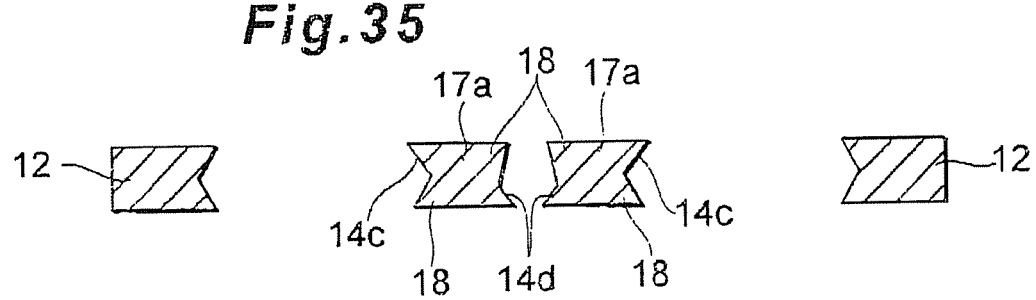
FIG. 35 is a view showing the method of manufacturing the optical deflector according to the fourth embodiment.
Figure 36:
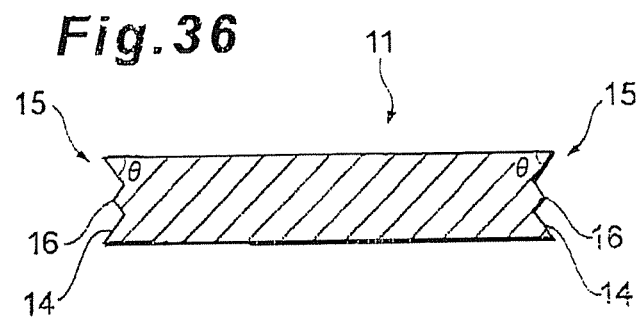
FIG. 36 is a view showing the method of manufacturing the optical deflector according to the fourth embodiment.

FIG. 35 shows the state in which the substrate 10 has been subjected to over-etching after providing the correction mask patterns 31d, 31e and 31f shown in FIGS. 34A and 34B. FIG. 35 shows a cross section similar to that of FIG. 31B. As shown in FIG. 35, convex portions 18 are formed on the back surface side of the outer side surfaces 14c of the two bars 17a of the elastic support portion 17 and on the front surface side of the inner side surfaces 14d of the two bars 17a of the elastic support portion 17. FIG. 36 shows a C-C cross section related to FIG. 31A. As shown in FIG. 36, each of the side surfaces 14 of the movable plate 11 is recessed toward the axis (Y-axis) perpendicular to the rotation axis (X-axis in FIG. 31), while convex portions 16 are formed respectively in the recesses in the corner portions 15 in the vicinity of the connecting portions 19 of the movable plate 11 and the two bars 17a of the elastic support portion 17.

By providing the correction mask patterns 31d, 31e and 31f in advance as described above, the cross section of each of the connecting portions 19 of the movable plate 11 and the two bars 17a of the elastic support portion 17 can be prevented from becoming smaller compared with the other portions. Accordingly, the rigidity of the elastic support portion 17 can be retained while reducing the moment of inertia. Note that, in each of the convex portions 18, besides the Si(111) surface, a (110) surface, (100) surface, (212) surface, (331) surface, (311) surface, (131) surface, (411) surface, (141) surface, etc., may emerge depending on the etching condition and the shape of the correction mask patterns 31d, 31e and 31f. Alternatively, a surface equivalent to any of theses surfaces may emerge.

As described above, the masks having the correction mask patterns 31d, 31e and 31f at the corner portions 15 in the vicinity of the connecting portions 19 of the movable plate 11 and the two bars 17a of the elastic support portion 17 are formed for etching, whereby even when etching progresses faster at the corner portions 15 in the vicinity of the connecting portions 19 compared with the other portions, the cross section of each of the connecting portions 19 of the movable plate 11 and the bars 17a can be ensured. Also, by providing the correction mask patterns 31d, 31e and 31f, the side surface 14 of the substrate 10 is recessed toward the axis while each of the convex portions 18 is formed in the connecting portion 19. Therefore, the stress concentration on the connecting portion 19 can be controlled, leading to prevention of damage of the elastic support portion 17. Furthermore, the connecting portion 19 is close to the rotational axis; therefore, even if the connecting portion 19 does not have a recess toward the axis, this will not influence the effect of reducing a rotation moment to such an extent.

The present invention is not limited to the descriptions of the above embodiments.

For example, the movable plate 11 may have a polygon shape not including a circular shape. Also, the movable plate 11 driven with one-dimensional one-degree-of-freedom has been shown as an example in the embodiments. However, the movable plate 11 of a two-dimensional drive type, and the movable plate 11 driven with one-dimensional two-degree-of-freedom may also be employed. When using an oscillation mirror of a two-dimensional drive type, the vertical mirror 104 is not necessary.

Also, in addition to the display device, the optical deflector 1 can be utilized in, e.g., a laser printer.

Various changes can be made within a range that does not depart from the gist of the present invention.

What is claimed is:

1. A method of manufacturing an optical deflector, comprising:
    forming respective masks, each of which has a predetermined pattern, on both surfaces of a substrate; and
    etching the substrate from both the surfaces using the masks to form a movable plate and a support portion that supports the movable plate from both sides,
    wherein, in the step of forming the movable plate and the support portion, the substrate is subjected to over-etching using wet etching to recess at least one portion, which is to be the movable plate, of a side surface of the substrate, and
    wherein, in the step of forming the masks, each of which has a predetermined pattern, on both the surfaces of the substrate, a mask is formed having:
        a first mask pattern corresponding to the movable plate;
        a second mask pattern corresponding to the support portion; and
        a correction mask pattern for preventing the cross section of a connecting portion of the movable plate and the support portion from becoming smaller compared with the at least one portion.

2. The method of manufacturing an optical deflector according to claim 1, comprising, after the step of forming the movable plate and the support portion, applying isotropic etching to the substrate to make a ridge line portion of a predetermined crystallographic plane of the substrate round.

3. The method of manufacturing an optical deflector comprising:
    forming respective masks, each of which has a predetermined pattern, on both surfaces of a substrate; and
    etching the substrate from both the surfaces using the masks to form a movable plate and a support portion that supports the movable plate from both sides,
    wherein, in the step of forming the movable plate and the support portion, the substrate is subjected to over-etching using wet etching to recess at least a portion, which is to be the movable plate, of a side surface of the substrate, and
    in the step of forming the masks, each of which has a predetermined pattern, on both the surfaces of the substrate, a mask is formed having:
        a first mask pattern corresponding to the movable plate;
        a second mask pattern corresponding to the support portion; and
        a correction mask pattern corresponding to a connecting portion of the movable plate and the support portion and being wider than the second mask pattern.

4. The method of manufacturing an optical deflector according to claim 3, comprising, after the step of forming the movable plate and the support portion, applying isotropic etching to the substrate to make a ridge line portion of a predetermined crystallographic plane of the substrate round.

* * * * *